United States Patent [19]
Kobayashi et al.

[11] Patent Number: 5,878,573
[45] Date of Patent: Mar. 9, 1999

[54] HYDRAULIC BRAKE SYSTEM

[75] Inventors: Michio Kobayashi; Masahiro Shimada, both of Higashimatsuyama, Japan

[73] Assignee: Jidosha Kiki Co., Ltd., Tokyo, Japan

[21] Appl. No.: 967,061

[22] Filed: Nov. 10, 1997

[51] Int. Cl.[6] .................................................. B60T 13/00
[52] U.S. Cl. .............................. 60/547.1; 60/562; 60/591
[58] Field of Search .................................. 60/533, 547.1, 60/547.2, 562, 591

[56] References Cited

U.S. PATENT DOCUMENTS

| | | | |
|---|---|---|---|
| 4,170,386 | 10/1979 | Shutt | 60/562 X |
| 4,578,951 | 4/1986 | Belart et al. | 60/591 X |
| 4,753,490 | 6/1988 | Belart et al. | 60/591 X |
| 4,754,605 | 7/1988 | Seibert et al. | 60/591 X |
| 5,027,599 | 7/1991 | Nishii et al. | 60/562 X |
| 5,462,343 | 10/1995 | Yoshida et al. | 60/547.1 X |

*Primary Examiner*—Hoang Nguyen
*Attorney, Agent, or Firm*—Kanesaka & Takeuchi

[57] ABSTRACT

In a hydraulic brake system of the present invention, the communication between a power chamber 30 of a hydraulic booster 2 and wheel cylinders (WCY) 58, 59 is allowed by a switching valve 64 when fluid pressure of an accumulator (ACC) 46 exceeds predetermined pressure. During braking operation, the fluid pressure of the ACC 46 introduced in the power chamber 30 is introduced directly to the WCYs 58, 59, thereby rapidly actuating brakes and thus improving the response. When the fluid pressure of the ACC 46 is less than the predetermined pressure, the communication between a fluid chamber 57 of a master cylinder (MCY) 3 and the WCYs 58, 59 is allowed by the switching valve 64. During braking operation, MCY pressure developed by a MCY piston 53 operated by an input shaft 21 through a power piston 10 is introduced into the WCYs 58, 59 through the switching valve 64. The brakes can securely work even when the fluid pressure of the ACC 46 is less than the predetermined pressure.

3 Claims, 5 Drawing Sheets

FIG. 1

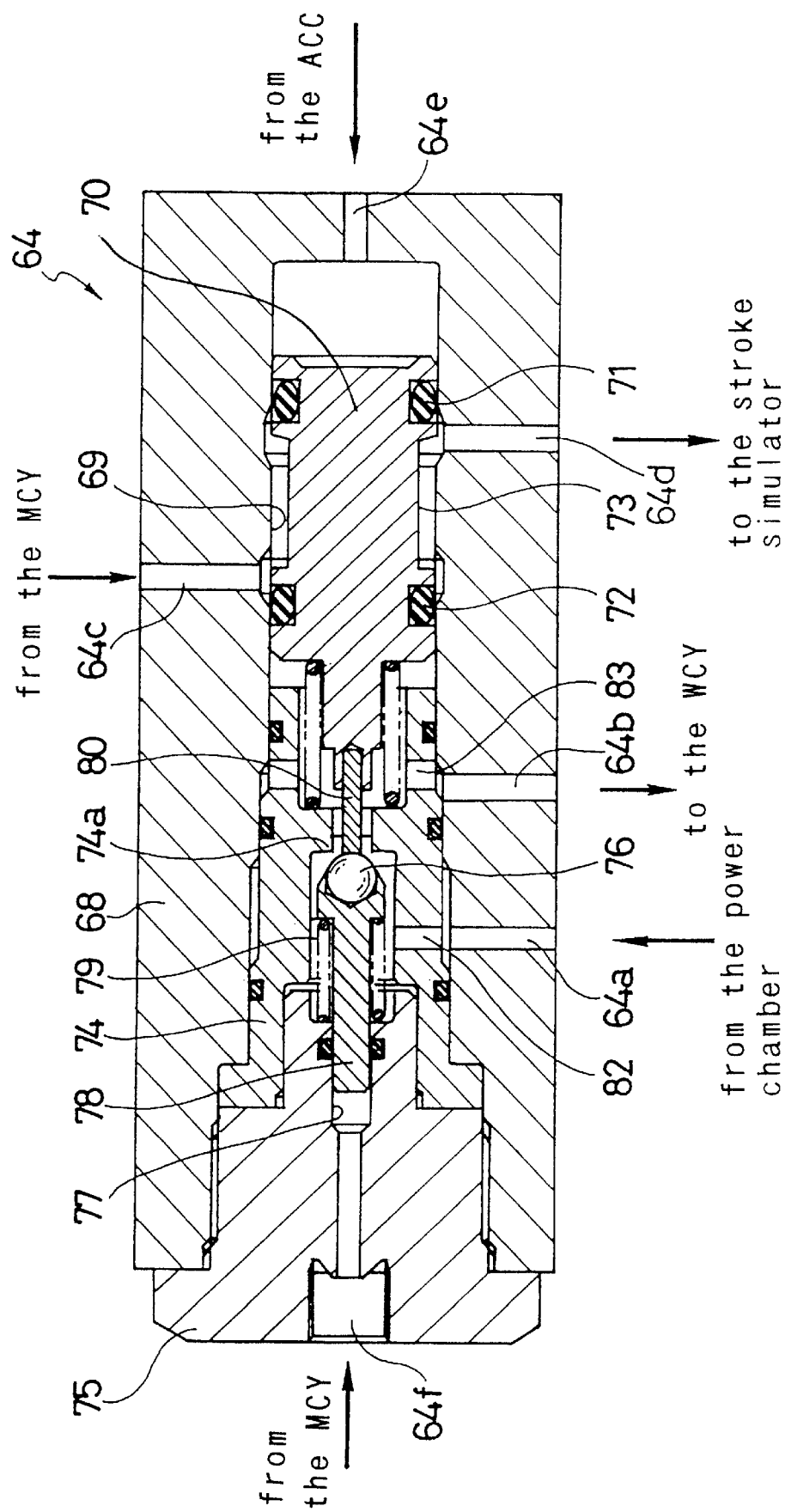

HYDRAULIC BRAKE SYSTEM

BACKGROUND OF THE INVENTION

The present invention relates to a hydraulic brake system using a hydraulic booster which boosts leg-power exerted on a brake pedal to a predetermined value, in which pressurized fluid introduced into a power chamber of the hydraulic booster is introduced into brake cylinders in order to actuate brakes, and more particularly to a hydraulic brake system in which master cylinder pressure developed in a master cylinder is supplied to brake cylinders through a switching valve when fluid pressure drops, thereby ensuring positive operation of brakes.

Sometimes employed in a vehicle is a hydraulic brake system which uses a hydraulic booster, which boosts leg-power exerted on a brake pedal to a predetermined value by pressurized fluid. In such a brake system, the pressurized fluid introduced into a power chamber of the hydraulic booster is introduced into brake cylinders in order to actuate brakes. Such a brake system can provide sufficient braking force with small leg-power on the brake pedal, thereby ensuring positive operation of the brakes and reducing the driver's labor.

In such a hydraulic brake system, it is desired to ensure positive operation of the brakes even when the fluid pressure drops. As one of conventional hydraulic brake systems which can ensure the positive operation of the brakes even when the fluid pressure drops, proposed in Japanese Unexamined Patent Publication No. 64-47659 is a hydraulic brake system which operates brakes by supplying fluid pressure developed in a hydraulic booster by a switching valve to wheel cylinders during normal operation, and ensure positive operation of the brakes by supplying master cylinder pressure developed in a master cylinder to wheel cylinders when fluid pressure drops.

In the hydraulic brake system disclosed in this publication, the operation of the switching valve is controlled by the fluid pressure introduced into a power chamber of the hydraulic booster during the braking operation. To be described in detail, the system has a piston disposed in the switching valve for controlling the operation of the switching valve and the piston is provided with a large-diameter portion and a small-diameter portion. When the braking operation is not performed, the piston is set in a position where the communication between the power chamber of the hydraulic booster and the wheel cylinders is interrupted and the communication between a fluid chamber of the master cylinder and the wheel cylinders is allowed, while when the braking operation is performed and the pressurized fluid is thereby introduced into the power chamber, the fluid pressure in the power chamber is applied to the large-diameter portion of the piston so as to set the piston in a position where the communication between the fluid chamber of the master cylinder and the wheel cylinders is interrupted and the communication between the power chamber of the hydraulic booster and the wheel cylinders is allowed.

However, in the conventional hydraulic brake system, the switching valve is set to interrupt the communication between the power chamber of the hydraulic booster and the wheel cylinders and allow the communication between the fluid chamber of the master cylinder and the wheel cylinders when the braking operation is not performed.

Therefore, when the braking operation is performed for normal braking under conditions of normal fluid pressure, the pressurized fluid is not supplied to the wheel cylinders until the switching valve is switched even after the fluid pressure is introduced into the power chamber of the hydraulic booster. Accordingly, the response of this system is not necessarily good. In addition, the direction, in which the fluid pressure is exerted on the large-diameter portion of the piston of the switching valve to switch the switching valve, opposes the direction, in which the fluid pressure of the pressurized fluid to be supplied to the wheel cylinders is exerted on the small-diameter portion, thereby causing loss in the fluid pressure. This is also a reason making the response insufficient.

When the fluid pressure drops, the fluid pressure in the master cylinder is supplied to the wheel cylinders through the switching valve. The master cylinder pressure is exerted on the piston in such a manner that the piston is moved in such a direction as to interrupt the communication between the fluid chamber of the master cylinder and the wheel cylinders. As the force of a spring is set to large in order to prevent the moving of the piston, the piston of the switching valve is difficult to move quickly when the hydraulic booster is actuated under conditions of normal fluid pressure, thereby further making the response worse. It is therefore not simply solved by just setting the force of the spring larger. Moreover, it is quite difficult to determine the force of the spring biasing a piston and a pressure receiving area of fluid pressure of the piston in such a manner as to securely and rapidly move the piston of the switching valve in the direction that allows the communication between the power chamber of the hydraulic booster and the wheel cylinder and interrupts the communication between the fluid chamber of the master cylinder and the wheel cylinders when the hydraulic booster is actuated under conditions of normal fluid pressure, and securely not to move the piston in the direction that allows the communication between the power chamber of the hydraulic booster and the wheel cylinder and interrupts the communication between the fluid chamber of the master cylinder and the wheel cylinders when the fluid pressure drops.

There is another problem that components of the switching valve such as a seal of the piston are inferior in durability because the piston of the switching valve moves in such a direction as to increase the volume of the fluid chamber of the master cylinder so as to increase the pedal stroke for normal braking and the piston moves every time the hydraulic booster is actuated.

SUMMARY OF THE INVENTION

It is an object of the present invention to provide a hydraulic brake system which can positively operate brakes under condition of low fluid pressure while providing good durability during normal braking under conditions of normal fluid pressure.

It is another object of the present invention to provide a hydraulic brake system which can allow reduced pedal stroke while providing good durability.

In order to achieve this object, the present invention provides a hydraulic brake system comprising: a fluid pressure source normally developing fluid pressure exceeding predetermined pressure; an input shaft which is operated when braking operation is performed; a hydraulic booster having a control valve controlled by the input shaft, a power chamber into which the fluid pressure is introduced from the fluid pressure source when the braking operation is performed, and a power piston which is actuated by the fluid pressure in the power chamber or by the input shaft, the fluid pressure being discharged from the power chamber by the control valve when the braking operation is not performed, the fluid pressure corresponding to the operating force being introduced into the power chamber when the braking operation is performed, and the hydraulic booster outputting according to the operation of the power piston by the fluid pressure in the power chamber; a master cylinder having a master cylinder piston which is interlocked with the power piston by the output of the hydraulic booster, the master cylinder developing master cylinder pressure in a fluid chamber thereof by the operation of the master cylinder piston; brake cylinders developing braking forces; and a switching valve selectively switching the brake cylinders to communicate with the power chamber of the hydraulic booster or with the fluid chamber of the master cylinder, wherein the switching valve is controlled by the fluid pressure of the fluid pressure source, and communicates the power chamber of the hydraulic booster with the brake cylinders when the fluid pressure of the fluid pressure source exceeds predetermined pressure or communicates the fluid chamber of the master cylinder with the brake cylinders when the fluid pressure of the fluid pressure source is less than the predetermined pressure.

In addition, in the present invention the switching valve comprises a valve controlling the communication or interruption between the power chamber and the brake cylinder, and a switching control piston valve which is exerted with the fluid pressure when the fluid pressure of the fluid pressure source exceeds the predetermined pressure and thus opens the valve to allow the communication between the power chamber and the brake cylinders and to interrupt the communication between the fluid chamber of the master cylinder and the brake cylinders or which closes the valve to interrupt the communication between the power chamber and the brake cylinders and to allow the communication between the fluid chamber of the master cylinder and the brake cylinder.

In the hydraulic brake system of the present invention as structured above, the switching valve allows the communication between the power chamber of the hydraulic booster and the brake cylinders whenever the fluid pressure of the fluid pressure source exceeds the predetermined pressure. Therefore, during braking operation, the fluid pressure introduced into the power chamber is directly introduced to the brake cylinder, thereby rapidly actuating the brakes. Accordingly, the response of the hydraulic brake system is improved. In addition, because the switching valve is controlled by the fluid pressure in the fluid pressure source, the fluid pressure, to be introduced to the brake cylinder, in the power chamber of the hydraulic booster never produces loss, thereby further improving the response of the hydraulic brake system.

Moreover, the switching valve allows the communication between the fluid chamber of the master cylinder and the brake cylinders when the fluid pressure in the fluid pressure source is less than the predetermined pressure. Since the input shaft thereby operates the master cylinder piston through the power piston when the braking operation is performed, the master cylinder develops master cylinder pressure which is then introduced into the brake cylinders through the switching valve. As a result of this, the brakes are securely actuated during the braking operation even when the fluid pressure in the fluid pressure source becomes less than the predetermined pressure.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a sectional view showing one embodiment of a hydraulic brake system in accordance with the present invention, FIG. 5 is a sectional view showing the switching valve of the hydraulic brake system shown in FIG. 1 with the switching valve being set in a first position.

DESCRIPTION OF THE PREFERRED EMBODIMENTS

Figure 1:
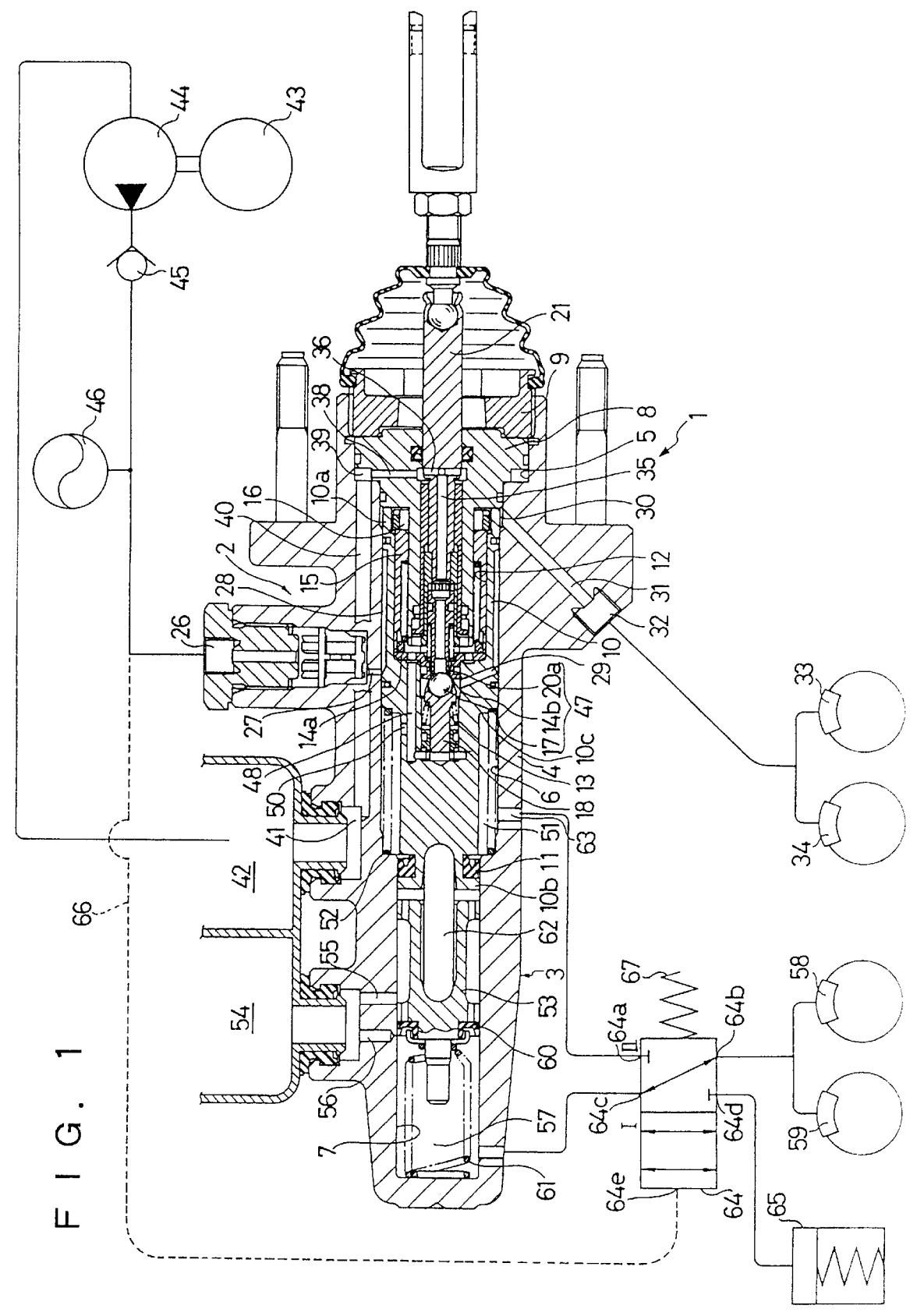
Figure 2:
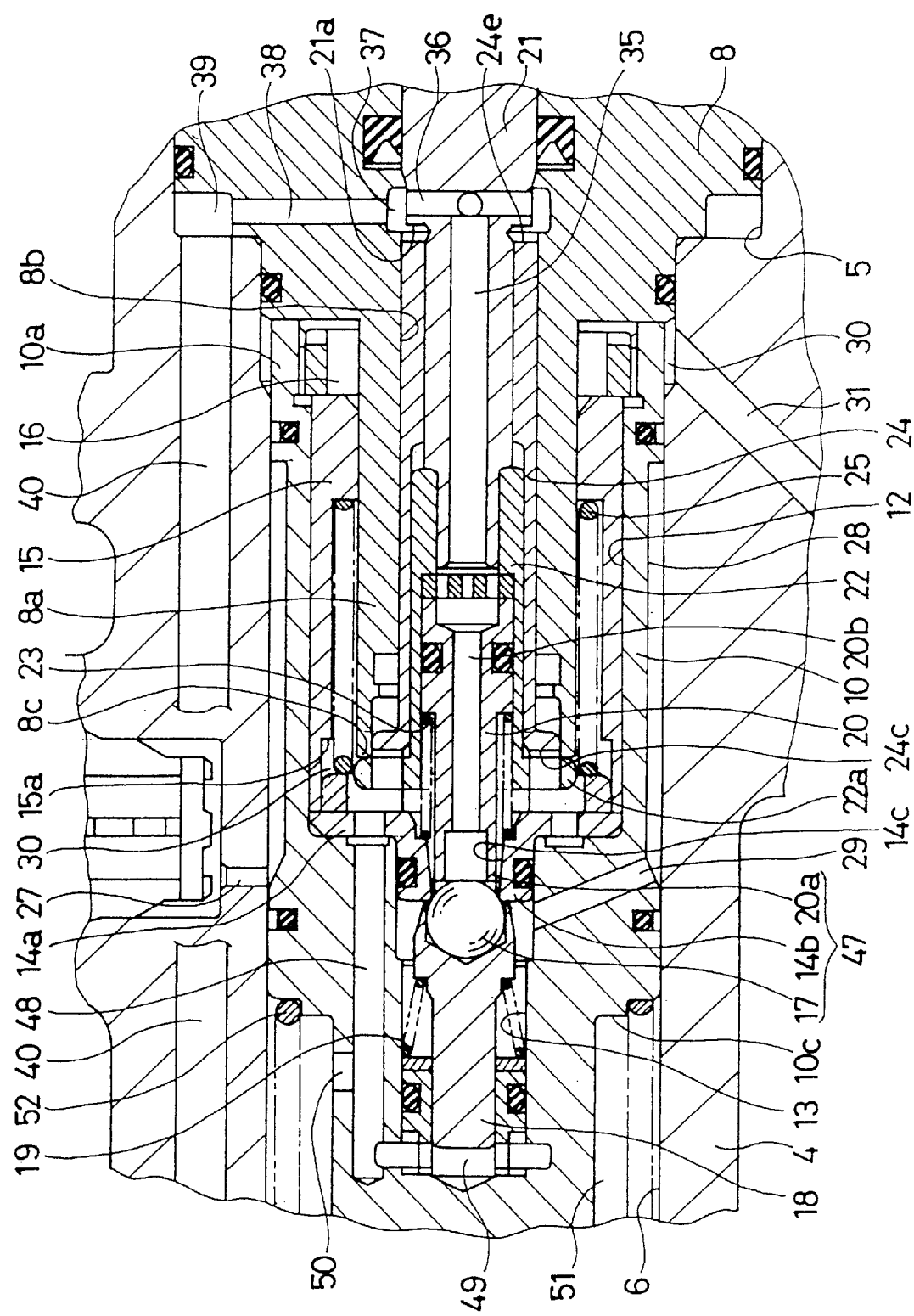
FIG. 2 is a partly enlarged sectional view of a hydraulic booster of the hydraulic brake system shown in FIG. 1.

FIG. 1 is a sectional view showing one embodiment of a hydraulic brake system in accordance with the present invention and FIG. 2 is a partly enlarged sectional view of a hydraulic booster of the hydraulic brake system shown in FIG. 1.

As shown in FIG. 1 and FIG. 2, the hydraulic brake system of this embodiment comprises a brake pressure-producing device 1 which includes a hydraulic booster 2, a master cylinder (hereinafter, sometimes referred to as "MCY") 3 actuated by the output of the hydraulic booster 2, the hydraulic booster 2 and the master cylinder 3 being integrated, and a housing 4 which is common to the hydraulic booster 2 and the MCY 3.

As for the hydraulic booster 2, the housing 4 is provided with a first hole 5 opening toward the right hand side in FIG. 1, a second hole 6 continuously formed at the left side of the first hole 5, the diameter of the second hole 6 being smaller than that of the first hole 5, and a third hole 7 continuously formed at the left side of the second hole 6 and having a closed left end, the diameter of the third hole 7 being smaller than that of the second hole 6. The first, second, and third holes 5, 6, 7 are integrally formed as a stepped hole. The right end of the first hole 5 is hermetically closed by a plug 8 which is in contact with the stepped portion between the first hole 5 and the second hole 6 and is fixed to the housing 4 by a nut 9 threaded into the housing 4.

Disposed within the second and third holes 6, 7 and extending across them is a power piston 10 of the hydraulic booster 2 which is structured as a stepped piston comprising a large-diameter portion 10a at the right side thereof having substantially the same diameter of the second hole 6 and a small-diameter portion 10b at the left side thereof having substantially the same diameter of the third hole 7. The large-diameter portion 10a is sealed with O-rings and allowed to slide in the second hole 6 and the small-diameter portion 10b is sealed by a cup packing 11 and allowed to slide in the third hole 7. In this case, the cup packing 11 seals fluid only in one direction so as to prevent fluid from flowing from the second hole 6 toward the third hole 7 while allowing fluid to flow from the third hole 7 toward the second hole 6 between the small-diameter portion 10b of the power piston 10 and the inner wall of the third hole 7 of the housing 4.

The power piston 10 is provided with a fourth hole 12 opening at the right end of the power piston 10 and a fifth hole 13 formed continuously from the left end of the forth hole 12 and having a closed left end thereof, the diameter of the fifth hole 13 being smaller than that of the fourth hole 12. The fourth and fifth holes 12, 13 are integrally formed as a stepped hole. Hermetically disposed in the fifth hole 13 is a cylindrical valve seat member 14 (not shown) which is fixed to the power piston 10 in such a manner that a flange 14a of the valve seat member 14 comes in contact with the stepped portion between the forth hole 12 and the fifth hole 13 by a nut 16 threaded into the right end of the power piston 10 through a cylindrical fixing member 15 inserted into the fourth hole 12. The cylindrical fixing member 15 is slidably fitted onto the circumference of a cylindrical projection 8a extending in the axial direction of the plug 8.

Slidably inserted into the fifth hole 13 is a valve body 18 supporting a valve ball 17. The valve body 18 is always biased by a spring 19 in such a direction that the valve ball 17 is seated in a first valve seat 14b of the valve seat member 14. The valve seat member 14 has an axial hole 14c in which a cylindrical member 20 is disposed. The cylindrical member 20 has a second valve seat 20a formed at the front end thereof in which the valve ball 17 is seated. The cylindrical member 20 is inserted into an axial hole of a cylindrical stopper 22 and is fixed to the cylindrical stopper 22 by a spring 23 compressed between the valve seat member 14 and the cylindrical member 20, the cylindrical stopper 22 being securely fitted onto the circumference of an input shaft 21 at the left end of the input shaft 21. The input shaft 21 and the cylindrical stopper 22 penetrate the cylindrical portion 8a of the plug 8 through the axial hole 8b thereof and the rear end of the input shaft 21 is connected to a brake pedal which is not shown. The rearmost positions for the cylindrical member 20 and the input shaft 21 are defined by that a flange 22a of the cylindrical stopper 22 comes in contact with a front end 8c of the cylindrical projection 8a of the plug 8.

Figure 3:
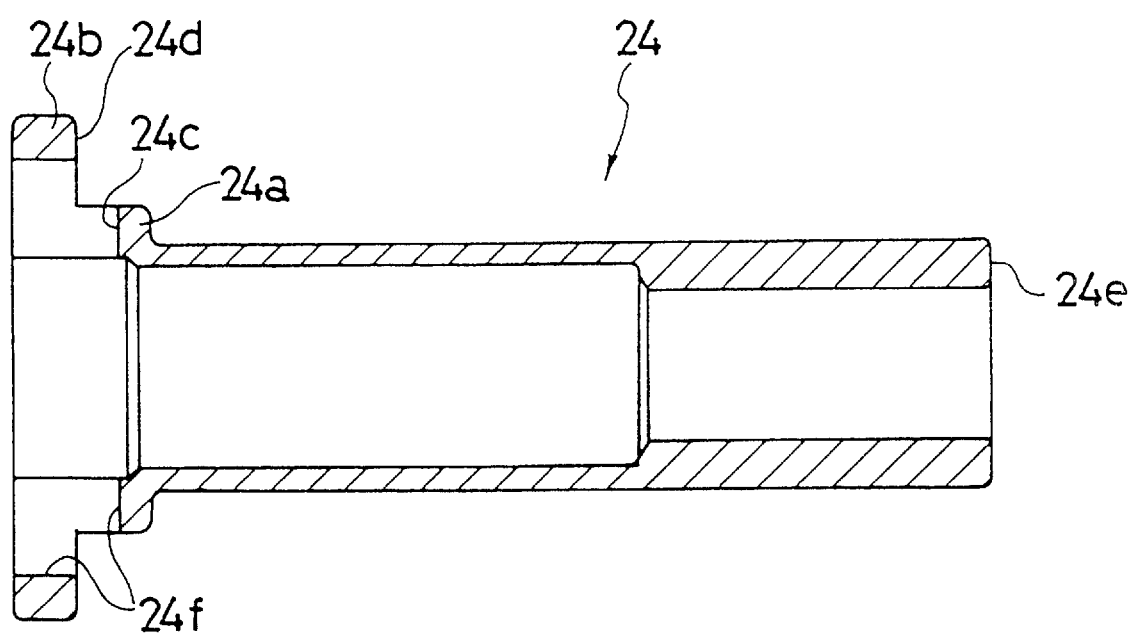
FIG. 3 is a sectional view showing in a detail a reaction piston of the hydraulic booster shown in FIG. 1 and FIG. 2.

Slidably inserted between the outer peripheries of the input shaft 21 and the cylindrical stopper 22 and the inner periphery of the axial hole 8b of the cylindrical projection 8a of the plug 8 is a cylindrical reaction piston 24. As shown in FIG. 3, the reaction piston 24 is provided with a first flange 24a and a second flange 24b at the left end thereof in FIG. 3. Since the flange 22a of the cylindrical stopper 22 can come in contact with the left end of the first flange 24a, the left end of the first flange 24a at this point functions as a stopper 24c for preventing further backward movement of the cylindrical stopper 22 relative to the reaction piston 24.

The left end of the second flange 24b functions as an engagement member 24d which engages with a stepped portion 15a of the cylindrical fixing member 15 when the reaction piston 24 retreats to a predetermined extent relative to the power piston 10. The right end 24e of the reaction piston 24 can come in contact with a stepped portion 21a of the input shaft 21. Compressed between the second flange 24b of the reaction piston 24 and the cylindrical fixing member 15 is a spring 25 whereby the second flange 24b of the reaction piston 24 is normally in contact with the flange 14a of the valve seat member 14.

The housing 4 is further provided with an inlet 26 through which pressurized fluid is introduced and a path 27 allowing the communication between the inlet 26 and the second hole 6 and the power piston 10 is provided with an annular groove 28, which communicates with the path 27, formed in the circumference of the power piston 10 and a path 29 allowing the communication between the annular groove 28 and the fifth hole 13 at the valve body 18 side of the valve seat member 14. The inlet 26, the path 27, the annular groove 28, and the path 29 form together a fluid pressure supply passage.

A space in the second hole 6 defined between the plug 8 and the right end of the power piston 10 is a power chamber 30 which always communicates with the axial hole 14c of the valve seat member 14. The flange 22a of the cylindrical stopper 22 and the first and second flange 24a, 24b of the reaction piston 24 are positioned in the power chamber 30. Formed between the outer periphery of the cylindrical projection 8a of the plug 8 and the inner periphery of the cylindrical fixing member 15 is an axial groove (not shown) so as to allow free flow of hydraulic fluid on the both sides of the cylindrical fixing member 15. The power chamber 30 always communicates with a first outlet 32 through a path 31 formed in the housing 4, and the first outlet 32 always communicates with wheel cylinders (hereinafter, sometimes referred to as "WCYs") 33, 34 relating to one of two braking circuits constituting the brake system.

Moreover, the axial hole 20b of the cylindrical member 20 opening to both the right and left sides always communicates with a discharge port 41 through an axial path 35 and a radial path 36 which are formed in the input shaft 21, an annular groove 37 and a radial path 38 which are formed in the plug 8, an annular space 39 formed between the plug 8 and the housing 4, and an axial passage 40 formed in the housing 4. The discharge port 41 always communicates with a booster reservoir 42 for the hydraulic booster.

Further, a hydraulic circuit connecting the inlet 26 and the booster reservoir 42 is provided with a hydraulic pump 44 driven by a motor 43 and an accumulator (hereinafter, sometimes referred to as "ACC") 46 at the discharge side of the hydraulic pump 44 via a check valve 45. Predetermined pressure is always stored in the ACC 46 by the discharge pressure of the hydraulic pump 44.

In the inoperative state i.e. when the brake pedal is not pedaled, the valve ball 17, the valve seat member 14, and the front end 20a (the second valve seat) of the cylindrical member 20 are in positions as shown in FIG. 1 and FIG. 2. That is, the valve ball 17 is seated in the first valve seat 14b of the valve seat member 14 and the second valve seat 20a of the cylindrical member 20 is apart from the valve ball 17. In this state, while the communication between the path 29 always communicating with the inlet 26 and the axial hole 14c of the valve seat member 14 is interrupted, the communication between the axial hole 14c of the valve seat member 14 and the axial hole 20b of the cylindrical member 20 always communicating with the discharge port 41 is allowed. Therefore, in the inoperative state, the power chamber 30 is shut off from the pump 44 and the ACC 46 and communicates with the booster reservoir 42 so that pressurized fluid is not supplied into the power chamber 30.

In the operative state i.e. when the brake pedal is pedaled, the input shaft 21 moves forward so that the valve ball 17 is seated in the second valve seat 20a of the cylindrical member 20 and the valve ball 17 is parted from the first valve seat 14b of the valve seat member 14. In this state, therefore, the communication between the path 29 and the axial hole 14c of the valve seat member 14 is allowed while the communication between the axial hole 14c of the valve seat member 14 and the axial hole 20b of the cylindrical member 20 is interrupted. That is, during the braking operation, the power chamber 30 communicates with the pump 44 and the ACC 46 and is shut off from the booster reservoir 42 so that pressurized fluid is supplied into the power chamber 30.

In this manner, the valve ball 17, the first valve seat of the valve seat member 14 and the second valve seat of the cylindrical member 20 constitute together a control valve 47 for the hydraulic booster 2 for selectively switching the power chamber 30 to communicate with the pump 44 and the ACC 46 or with the booster reservoir 42.

Furthermore, the power chamber 30 always communicates with a chamber 49 facing the left end of the valve body 18 through an axial path 48 formed in the power piston 10, and always communicates with an annular chamber 51 formed between the inner periphery of the second hole 6 of the housing 4 and the outer periphery of the small-diameter portion 10b of the power piston 10 through the path 48 and a radial path 50, extending from the path 48, formed in the power piston 10. The annular chamber 51 accommodates a return spring 52 which always biases the power piston 10 in a direction toward the inoperative position.

As for the MCY 3, this MCY 3 has the same structure as a general conventional single MCY. That is, a MCY piston 53 is slidably inserted into the third hole 7 of the housing 4. In addition, a MCY reservoir 54 is mounted on the housing 4 and the housing 4 is provided with a brake fluid supply port 55 and a compensating port 56 to communicate the MCY reservoir 54 with the third hole 7. Moreover, a fluid chamber 57 is defined in the third hole 7 by MCY piston 53. Mounted on the front end of the MCY piston 53 is a cup packing 60. When the cup packing 60 is in the inoperative position in the right side of the opening end of the compensating port 56, the fluid chamber 57 communicates with the MCY reservoir 54 so that MCY pressure is not developed in the fluid chamber 57. When the cup packing 60 of the MCY piston 53 then moves toward the left side of the opening end of the compensating port 56 and play in stroke for the WCYs 58, 59 is canceled, the MCY pressure is developed.

Moreover, in the brake pressure-producing device 1 of the hydraulic brake system of this embodiment, the effective receiving area of an annular stepped portion 10c between the large-diameter portion 10a and the small-diameter portion 10b of the power piston 10 is set to be dimensions given by subtracting the effective receiving area of the small-diameter portion 10b of the power piston 10 by the cup packing 11 from the effective receiving area of the power piston 10 to which the fluid pressure in the power chamber 30 is exerted while the effective receiving area of the small-diameter portion 10b of the power piston 10 by the cup packing 11 is set to be equal to the effective receiving area of the MCY piston 53 to which the MCY pressure is exerted. That is, the substantial receiving area of the power piston 10 to which the fluid pressure in the power chamber 30 is exerted is set to be equal to the effective receiving area of the MCY piston 53 to which the MCY pressure in the fluid chamber 57 of the MCY 3 is exerted.

Further, the MCY piston 53 is always biased to the right, i.e. in the direction toward the inoperative position by a return spring 61 and an aligning rod 62 is disposed between the power piston 10 and the MCY piston 53 whereby the both pistons 10, 53 are aligned and are allowed to be interlocked with each other.

The annular chamber 51 of the hydraulic booster 2 communicates, through a second outlet 63 formed in the housing 4, with a first port 64a of a switching valve 64 consisting of a two position four-way valve while a second port 64b of the switching valve 64 communicates with the WCYs 58, 59 relating to the other one of the two braking circuits. The fluid chamber 57 of the MCY 3 communicates with a third port 64c of the switching valve 64 while a fourth port 64d of the switching valve 64 communicates with a stroke simulator 65 for ensuring the stroke of the MCY piston 53.

The switching valve 64 can switch between a first position I where the first port 64a and the second port 64b are in communication and the third port 64c and the fourth port 64d are in communication and a second position II where the first port 64a is shut off from the other ports and the third port 64c and the second port 64b are in communication. The fluid pressure of the ACC 46 is introduced as pilot pressure into a pilot pressure inlet 64e of the switching valve 64 through pilot pressure path 66, the pilot pressure when exceeding predetermined pressure shifts the switching valve 64 to the first position I. The switching valve 64 is biased by the spring force of a spring 67 which shifts the switching valve 64 to the second position II when the pilot pressure is less than the predetermined pressure.

Figure 4:
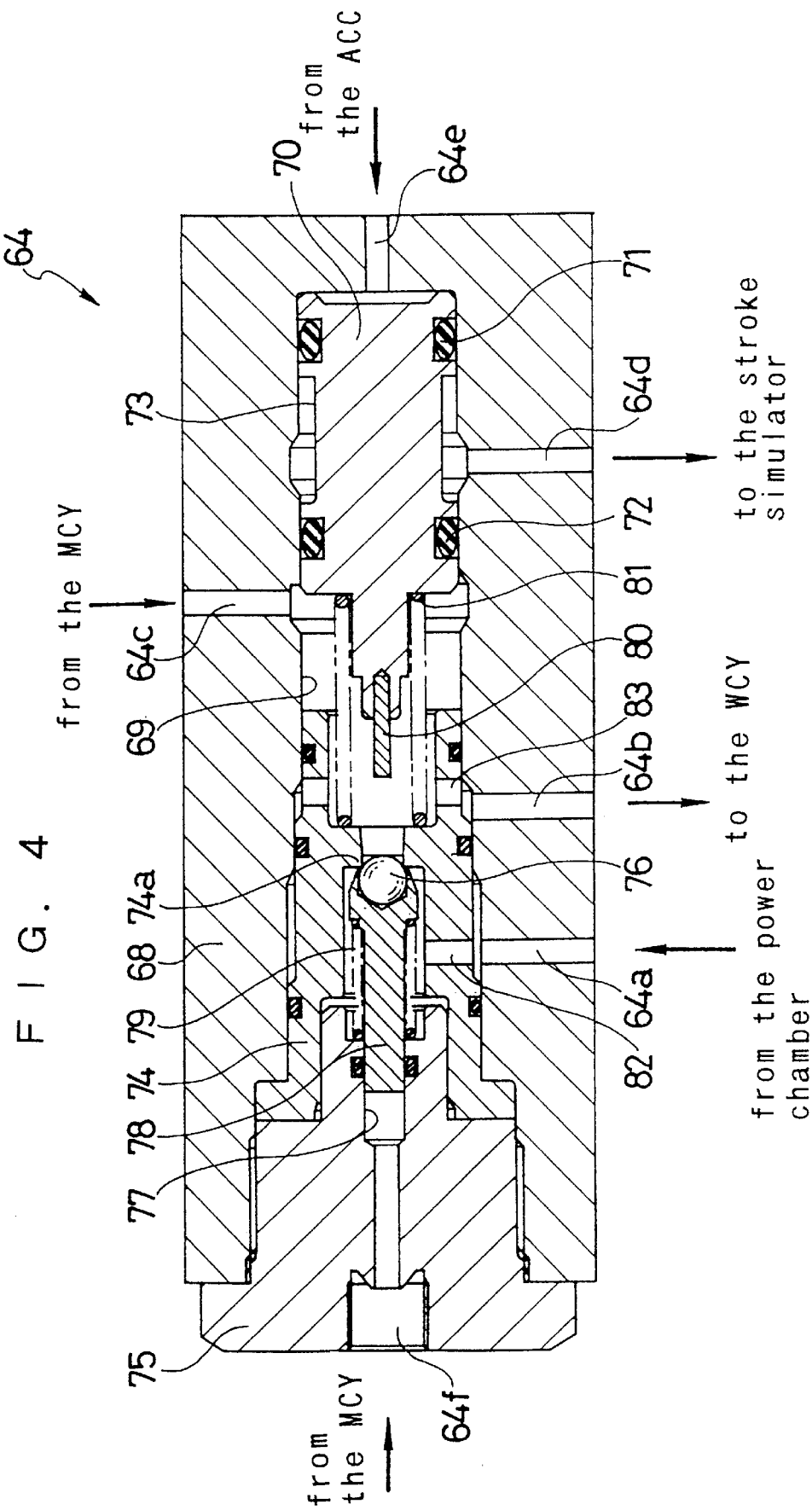
FIG. 4 is a sectional view showing a switching valve of the hydraulic brake system shown in FIG. 1 with the switching valve being set in a second position.

FIG. 4 is a view of a concrete example of the switching valve 64.

As shown in FIG. 4, the switching valve 64 comprises a housing 68 and a switching control piston valve 70 which is hermetically and slidably disposed, by two O-rings 71, 72, in an axial hole 69 formed in the housing 68. The switching control piston valve 70 is provided with an annular groove 73 formed in the outer periphery thereof between the O-rings 71 and 72.

Also hermetically inserted into the axial hole 69 is a valve seat member 74 having a valve seat 74a, the valve seat member 74 being fixed by a plug 75 threaded into the housing 64. A valve ball 76 is disposed in the inner hole of the valve seat member 74 in such a manner that the valve ball 76 can be seated in the valve seat 74a. The valve ball 76 is supported by a valve body 78 which is hermetically inserted into a hole 77 of the plug 75. The valve ball 76 is always biased in such a direction as to be seated in the valve seat 74a by the spring force of a spring 79 compressed between the valve body 78 and the plug 75.

Projecting from the end of the switching control piston valve 70, facing the valve ball 76, toward the valve ball 76 is a valve opening pin 80 pushing the valve ball 76 in such a direction as to detach the valve ball 76 from the valve seat 74a. The switching control piston valve 70 is always biased in such a direction as to part the valve opening pin 80 from the valve ball 76 by the spring force of a spring 81 compressed between the switching control piston valve 70 and the valve seat member 74. These springs 79 and 81 constitute together the spring 67 for shifting the switching valve 64 to the second position II.

The first port 64a formed in the housing 64 always communicates with the inner hole of the valve seat member 74, in which the valve ball 76 and the valve body 78 are accommodated, through a radial path 82 formed in the valve seat member 74. The second port 64b formed in the housing 64 always communicates with the axial hole 69, in which the valve opening pin 80 is positioned, through a radial path 83 formed in the valve seat member 74. In addition, the third port 64c and the fourth port 64d formed in the housing 64 communicate with the axial hole 69 within a range where the switching control piston valve 70 slides. The pilot pressure inlet 64e formed in the housing 64 faces the end opposite to the end of the switching control piston valve 70 from which the valve opening pin 80 projects.

When fluid pressure stored in the ACC 46 is less than the predetermined pressure, as shown in FIG. 4, the switching control piston valve 70 is biased to the right by the spring force of the spring 81 so as to come in contact with the right end of the axial hole 69 of the housing 68. When the switching control piston valve 70 is in this position, the valve opening pin 80 is largely parted from the valve ball 76 so that the valve ball 76 is seated in the valve seat 74a and the first port 64a is thus shut off from the other ports. In addition, the third port 64c communicates with the second port 64b and the fourth port 64d is shut off from the other ports. That is, the switching valve 64 is set in the second position II.

When the fluid pressure stored in the ACC 46 exceeds the predetermined pressure, as shown in FIG. 5, the switching control piston valve 70 is shifted to the left against the spring force of the spring 81 by the pilot pressure, developed by the fluid pressure of the ACC 46 and introduced into the switching control piston valve 70 through the pilot pressure inlet 64e, so that the valve opening pin 80 pushes and detaches the valve ball 76 from the valve seat 74a. When the switching control piston valve 70 is in this position, the first port 64a communicates with the second port 64b because the valve ball 76 is apart form the valve seat 74a. In addition, the third port 64c and the fourth port 64d are positioned between the two O-rings 71 and 72 of the switching control piston valve 70 and the O-ring 72 is positioned between the second port 64b and the third port 64c so that the third port 64c is shut off form the second port 64b and communicates with the fourth port 64d through the annular groove 73. That is, the switching valve 64 is set in the first position I.

The plug 75 is provided with a MCY pressure inlet 64f communicating with the hole 77. Therefore, when the MCY pressure is introduced into the axial hole 69 through the third port 64c so that the MCY pressure is exerted on the valve ball 76 in such a manner as to part the valve ball 76 from the valve seat 74a while the switching valve 64 is in the second position II as shown in FIG. 4, the MCY pressure is also exerted on the valve body 78 through the MCY pressure inlet 64f in such a direction that the valve ball 76 is seated in the valve seat 74a, thereby preventing the valve ball 76 from being parted from the valve seat 74a.

In the brake pressure-producing device 1 of the hydraulic brake system of this embodiment as structured above, normally, the motor 43 is driven to operate the hydraulic pump 44 so that fluid pressure exceeding the predetermined pressure is stored in the ACC 46. In this state, the fluid pressure in the ACC 46 is introduced into the pilot pressure inlet 64e through the pilot pressure path 66 whereby the switching valve 64 is set in the first position I as shown in FIG. 1 and FIG. 5. As a result of this, the WCYs 58, 59 communicate with the power chamber 30 through the annular chamber 51 of the hydraulic booster 2 and are shut off from the fluid chamber 57 of the master cylinder 3.

In the inoperative state i.e. when the brake pedal is not pedaled, the input shaft 21 does not move forward and the control valve 47 of the hydraulic booster 2 is thus in the inoperative state as shown in FIG. 1 and FIG. 2. Therefore, no pressurized fluid is supplied from the ACC 46 to the power chamber 30 so that the power piston 10 does not work and the hydraulic booster 2 does not output. Since the annular chamber 51 always communicates with the power chamber 30, no pressurized fluid is also supplied from the ACC 46 to the annular chamber 51 when the brake pedal is not pedaled.

The right end 24e of the reaction piston 24 is apart form the stepped portion 21a of the input shaft 21 and the flange 22a of the cylindrical stopper 22 is apart form the stopper 24c of the first flange 24a and is therefore advanced from the stopper 24c.

As the braking operation is performed by pedaling the brake pedal, the input shaft 21 and the cylindrical member 20 move forward to switch the control valve 47 as mentioned above. As a result of this, the power chamber 30 is shut off form the booster reservoir 42 and communicates with the ACC 46 so that the pressurized fluid is introduced from the ACC 46 into the power chamber 30. When the pressure of the pressurized fluid introduced in the power chamber 30 grows to reach a level that can overcome the spring forces of the return springs 52 and 61, the power piston 10 moves forward by the pressurized fluid so that the hydraulic booster 2 is actuated and the MCY piston 53 moves forward, thereby developing MCY pressure in the fluid chamber 57. The pressurized fluid in the power chamber 30 is introduced into the WCYs 33, 34 relating to the one circuit and is introduced into the annular chamber 51 through the paths 48, 50. The pressurized fluid introduced into the annular chamber 51 is further introduced into the WCYs 58, 59 relating to the other circuit through the second outlet 63 and the switching valve 64. In addition, the MCY pressure is introduced into the stroke simulator 65 via the switching valve 64, thereby ensuring the stroke of the master cylinder piston 53, i.e. the stroke of the power piston 10.

Though the reaction piston 24 is shifted to the right relative to the power piston 10 and the input shaft 21 by the fluid pressure in the power chamber 30 against the spring force of the spring 25, the rear end 24e of the reaction piston 24 never reaches to the stepped portion 21a of the input shaft 21. The fluid pressure in the annular chamber 51, i.e. the fluid pressure in the power chamber 30 is exerted on the annular stepped portion 10c of the power piston 10 in the direction opposite to the direction exerting on the power piston 10. In this case, since the effective receiving area of the power piston 10 on which the fluid pressure in the power chamber 30 is substantially exerted is equal to the effective receiving area of of the MCY piston 53 where the MCY in the fluid chamber 57 is received as mentioned above while the power piston 10 and the MCY piston 53 are interlocked with each other through the aligning rod 62, the fluid pressure in the power chamber 30 and the MCY pressure balance to be equal to each other.

The pressurized fluid in the power chamber 30 is further introduced into the chamber 49 through the axial path 48 so that the valve body 18 is biased in the direction opposing the input of the input shaft 21 by the fluid pressure in the chamber 49.

In the initial stage where the WCYs produce substantially no braking force wherein there is play in stroke for each WCY 34, 35; 58, 59, the right end 24e of the reaction piston 24 does not come in contact with the stepped portion 21a of the input shaft 21 so that no force from the reaction piston 24 is exerted on the input shaft 21. Therefore, exerted on the input shaft 21 is force developed by the fluid pressure in the power chamber 30 and received by relatively small effective receiving areas of the cylindrical stopper 22 and the cylindrical member 20 and this force is transmitted as reaction force to a driver.

As the reaction force becomes equal to the input force of the input shaft 21, the valve ball 17 is seated in both the first valve seat 14b and the second valve seat 20a so that the power chamber 30 is shut off from the ACC 46 and the booster reservoir 42. As the input force of the input shaft 21 further grows, the valve ball 17 is seated in the second valve seat 20a and the valve ball 17 is parted from the first valve seat 14b again so that further fluid pressure is supplied to the power chamber 30 with the result that the fluid pressure in the power chamber 30 further rises. After that, by repeating the seating of the valve ball 17 in the first valve seat 14b, as the input of the input shaft 21 grows, the fluid pressure in the power chamber 30 successively rises at the predetermined power ratio.

While the respective WCYs 33, 34; 58, 59 are in play range of stroke, the right end 24e of the reaction piston 24 does not come in contact with the stepped portion 21a of the input shaft 21 so that the effective receiving area of the input shaft 21 on which the fluid pressure in the power chamber 30 is exerted is small and the power ratio at this point is therefore large. Accordingly, the output of the hydraulic booster 2 rises quite largely relative to the input force of the input shaft 21 at the large power ratio so that the hydraulic booster 2 performs the so-called jumping action.

As the fluid pressure in the power chamber 30 further rises and the power piston 10 further moves forward so that the play in stroke for the respective WCYs 33, 34; 58, 59 is canceled, the WCYs 33, 34; 58, 59 produce braking forces and the brakes thereby substantially work. In this state, the right end 24e of the reaction piston 24 comes in contact with the stepped portion 21a of the input shaft 21 by the risen fluid pressure in the power chamber 30 and the reaction piston 24 exerts force on the input shaft 21 with the biasing force by fluid pressure in the power chamber 30 in such a manner as to oppose the input force of the input shaft 21. Therefore, the reaction force exerted on the input shaft 21 grows and the output of the hydraulic booster 2 rises relative to the input force of the =. input shaft 21 with a ratio smaller than that when the WCYs are in the play range and then the jumping action is finished.

After that, since the reaction force grows, the hydraulic booster 2 boosts the input force of the input shaft 21 at a relatively small power ratio and the fluid pressure in the power chamber 30 becomes to correspond to the power ratio. Then, the pressurized fluid in the power chamber 30 is introduced into the respective WCYs 33, 34; 58, 59 so that the WCYs 33, 34; 58, 59 produce braking forces which are large relative to the input force of the input shaft 21 and the brakes thereby work with the braking forces.

As releasing the brake pedal to cancel the braking, the input shaft 21 and the cylindrical member 20 move to the right and the second valve seat 20a of the control valve 47 is parted from the valve ball 17 so that the power chamber 30 communicates with the booster reservoir 42. Therefore, the pressurized fluid in the power chamber 30 is discharged into the booster reservoir 42 through the axial hole 14c of the valve seat member 14, a space between the valve ball 17 and the second valve seat 20a, the axial hole 20b of the cylindrical member 20, the axial path 35 and radial path 36 of the input shaft 21, the annular groove 37 and the radial path 38 of the plug 8, an annular space 39 between the plug 8 and the housing 4, the axial path 40 of the housing 4, and the discharge port 41. At this point, since the input shaft 21 largely retreats until the flange 22a of the cylindrical stopper 22 comes into contact with the stopper 24c of the reaction piston 24, the second valve seat 20a is largely parted from the valve ball 17. Therefore, the pressurized fluid in the power chamber 30 is rapidly discharged, thereby reducing the fluid pressure in the power chamber 30.

As a result of the discharge of the pressurized fluid in the power chamber 30, the pressurized fluid in the respective WCYs 33, 34; 58, 59 is also rapidly discharged into the booster reservoir 42 through the power chamber 30 (the pressurized fluid in the WCY 58, 59 is discharged through the switching valve 64 and the annular chamber 51) and the power piston 10 rapidly retreats by the spring force of the return spring 52, thereby rapidly canceling the braking. As a result of the retreat of the power piston 10, the MCY piston 53 also rapidly retreats so that the fluid chamber 57 of the MCY 3 communicates with the MCY reservoir 54.

As the fluid pressure in the power chamber 30 is reduced to the predetermined pressure, the reaction piston 24 moves forward relative to the power piston 10 and the input shaft 21 by the spring force of the spring 25 and comes in contact with the flange 14a of the valve seat member 14 while the right end 24e of the reaction piston 24 is parted from stepped portion 21a of the input shaft 21.

As the input shaft 21 further retreats until the cancellation of the braking is nearly finished, the flange 22a of the cylindrical stopper 22 comes in contact with the front end 8c of the cylindrical projection 8a of the plug 8, thereby stopping the retreat of the input shaft 21 and the cylindrical member 20. At this point, the input shaft 21 and the cylindrical member 20 are in the rearmost positions. However, even when the input shaft 21 and the cylindrical member 20 stop retreating, the power piston 10, the reaction piston 24, the valve ball 17, and the valve seat member 14 continue to retreat. Therefore, the flange 22a of the cylindrical stopper 22 is parted from the stopper 24c of the reaction piston 24 while the valve ball 17 approaches the second valve seat 20a of the cylindrical member 20.

As the right end of the power piston 10 comes in contact with the plug 8 as shown in FIG. 1 and FIG. 2, the power piston 10 stops retreating and is in the inoperative position and the MCY piston 53 also stops retreating and is in the inoperative position, thereby rapidly and completely canceling the braking. In this state, the valve ball 17 is very close to the second valve seat 20a so that the space between the valve ball 17 and the second valve seat 20a is so small, that is, the valve ball 17 is on the verge of sitting. Therefore, if the input shaft 21 and the cylindrical member 20 move forward by pedaling the brake pedal, the valve ball 17 sits straight in the second valve seat 20a while the valve ball 17 is parted straight from the first valve seat 14b. That is, the play in stroke for performing the switching operation of the control valve 47 is significantly reduced, thereby rapidly actuating the brakes.

In this manner, the brakes are rapidly actuated when the braking operation is performed, while the braking is rapidly canceled when the braking operation is canceled. In short, the brake pressure-producing device 1 has excellent response.

On the other hand, as the fluid pressure in the ACC 46 becomes smaller than the predetermined pressure, the switching control piston valve 70 is moved to the right from the position shown in FIG. 5 by the spring force of the spring 81 and reaches the position shown in FIG. 4 so that the valve ball 76 sits in the valve seat 64a. That is, the switching valve 64 is set in the second position II where the annular chamber 51 of the hydraulic booster 2 is shut off form the WCYs 58, 59 and the fluid chamber 57 of the master cylinder 3 communicates with the WCYs 58, 59.

As the input shaft 21 moves forward by pedaling the brake pedal in this state, the second valve seat 20a of the cylindrical member 20 comes in contact with the valve ball 17 and the valve ball 17 is parted from the first valve seat 14b as mentioned above. However, since the fluid pressure in the ACC 46 is smaller than the predetermined pressure, the power piston 10 does not move forward. As the input shaft 21 further moves forward, the valve body 18 holding the valve ball 17 comes in contact with the power piston 10 whereby the leg-power exerted on the brake pedal is transmitted to the power piston 10 through the input shaft 21, the cylindrical member 20, the valve ball 17, and the valve body 18. After that, the power piston is moved forward with the leg-power in this manner.

As a result of the forward movement of the power piston 10, the MCY piston 53 also moves forward in the same manner as mentioned above so that MCY pressure is developed in the fluid chamber 57 and is introduced into the WCYs 58, 59 through the switching valve 64. The WCYs 58, 59 thus produce braking forces and the brakes relating to the other circuit are actuated with the leg-power. In this manner, the positive operation of the brakes is ensured even when the fluid pressure of the ACC 46 becomes smaller than the predetermined pressure.

According to the hydraulic brake system of this embodiment, even when the fluid pressure of the ACC 46 becomes smaller than the predetermined pressure, the positive operation of the brakes is ensured because the MCY pressure in the MCY 3 is supplied to the WCYs 58, 59 by the switching valve 64 during the braking operation.

Since the switching control of the switching valve 64 is performed with the fluid pressure of ACC 46 and the communication between the power chamber 30 of the hydraulic booster 2 and the WCYs 58, 59 is allowed whenever fluid pressure exceeding the predetermined pressure is stored in the ACC 46, the brakes can be actuated more rapidly than a case where the switching valve is controlled by the fluid pressure of the power chamber of the hydraulic booster as prior art, thereby further improving the response of the hydraulic brake system. Since the switching valve 64 is controlled by the fluid pressure of the ACC 46, the fluid pressure in the power chamber of the hydraulic booster never produces loss, thereby further improving the response of the hydraulic brake system.

Moreover, when the fluid pressure of the ACC 46 drops, the MCY pressure of the MCY 3 is supplied to the WCYs 58, 59 through the switching valve 64. Since the MCY pressure never functions as pilot pressure of the switching valve 64 for controlling the switching, the interruption between the fluid chamber 57 of the MCY 3 and the WCYs 58, 59 is securely prevented when the fluid pressure drops. In addition, the switching of the switching valve 64 is not influenced by the MCY pressure when the fluid pressure drops, thereby further improving the response and facilitating the setting of the receiving area receiving the pilot pressure of the switching valve 64 and the spring force of the spring 67.

Further, in both cases where the fluid pressure is normal and where the fluid pressure drops, the volume of the fluid chamber 57 of the MCY 3 is never increased by the switching of the switching valve 64, thereby securely preventing the pedal stroke during braking from being increased.

Furthermore, the piston 70 of the switching valve 64 moves only when the fluid pressure of the ACC 46 drops while the piston 70 is independent of the operation of the hydraulic booster 2 so as not to move when the fluid pressure is normal, thereby improving the durability of the O-rings 71, 72 of the piston 70. In addition, in this case, the case where the fluid pressure drops is quite rare and in most cases, the fluid pressure is normal, thereby further improving the durability of the O-rings 71, 72.

Though the present invention is applied to the hydraulic booster system using the brake pressure-producing device such that the control valve is built in the power piston in the above embodiment, the present invention can be applied to a booster system using a brake pressure-producing device being of such a type that a control valve for the hydraulic booster is disposed out of a power piston as disclosed in the aforementioned publication.

Though the pressurized fluid in the power chamber 30 is supplied to the WCYs 58, 59 relating to the other circuit through the annular chamber 51 disposed in the hydraulic booster 2 and communicating with the power chamber 30 in the above embodiment, the pressurized fluid in the power chamber 30 can be supplied directly to the WCYs 58, 59 relating to the other circuit without the annular chamber.

As apparent from the above description, in the hydraulic brake system according to the present invention, since the power chamber is communicated with the brake cylinders by the switching valve whenever the fluid pressure in the fluid pressure source exceeds the predetermined pressure, the fluid pressure introduced in the power chamber can be introduced directly to the brake cylinders when the braking operation is performed, thereby rapidly actuating the brakes. As a result of this, the response of the hydraulic brake system can be improved. Because the switching valve is controlled by the fluid pressure in the fluid pressure source, the fluid pressure, to be introduced to the brake cylinders, in the power chamber of the hydraulic booster never produces loss, thereby further improving the response of the hydraulic brake system.

Since the fluid chamber of the master cylinder is communicated with the brake cylinders through the switching valve when the fluid pressure in the fluid pressure source is less than the predetermined pressure, the brakes are securely actuated during the braking operation even when the fluid pressure in the fluid pressure source becomes less than the predetermined pressure.

Also according to the present invention, the switching of the switching control piston valve is not influenced by the master cylinder pressure during the fluid pressure drops, thereby further improving the response and facilitating the setting of the receiving area receiving the pilot pressure of the switching control piston valve and the biasing force of biasing means such as a spring for biasing the switching control piston valve.

In addition, since the master cylinder pressure is never exerted as pilot pressure for controlling the switching on the switching control piston valve when the fluid pressure drops, the interruption between the fluid chamber of the master cylinder and the brake cylinders is securely prevented during the fluid pressure drops.

Further, in both cases where the fluid pressure is normal and where the fluid pressure drops, the volume of the fluid chamber of the master cylinder is never increased by the switching of the switching control piston valve, thereby securely preventing the pedal stroke during braking from being increased.

Furthermore, the switching control piston valve is moved only when the fluid pressure drops while the switching control piston valve is independent of the operation of the hydraulic booster so as not to move when the fluid pressure is normal, thereby improving the durability of the seals of the switching control piston valve. In addition, in this case, the case where the fluid pressure drops is quite rare and in most cases, the fluid pressure is normal, thereby further improving the durability of the seals.

What we claim is:

1. A hydraulic brake system comprising;
  a fluid pressure source for developing fluid pressure exceeding a predetermined pressure;
  an input shaft which is operated when a braking operation is performed;
  a hydraulic booster having a control valve controlled by said input shaft, a power chamber into which the fluid pressure is introduced from said fluid pressure source when the braking operation is performed, and a power piston which is actuated by the fluid pressure in said power chamber or by said input shaft, the fluid pressure being discharged from said power chamber by said control valve when the braking operation is not performed, the fluid pressure corresponding to an operating force being introduced into said power chamber when the braking operation is performed, and the hydraulic booster outputting according to an operation of the power piston by the fluid pressure in said power chamber;

a master cylinder having a master cylinder piston which is interlocked with said power piston and operated by the output of said hydraulic booster, said master cylinder developing master cylinder pressure in a fluid chamber thereof by an operation of the master cylinder piston;

brake cylinders developing braking forces; and a switching valve selectively switching said brake cylinders to communicate with said power chamber of said hydraulic booster or with said fluid chamber of said master cylinder, said switching valve being controlled by the fluid pressure of said fluid pressure source and including a valve for controlling communication between the power chamber and the brake cylinders, and a switching control piston valve to which the fluid pressure is applied, said switching control piston valve, when the fluid pressure of said fluid pressure source exceeds the predetermined pressure, opening said valve to allow the communication between said power chamber and said brake cylinders and to interrupt the communication between the fluid chamber of the master cylinder and the brake cylinders, or when the fluid pressure of said fluid pressure source is less than the predetermined pressure, closing the valve to interrupt the communication between the power chamber and the brake cylinders and to allow the communication between the fluid chamber of the master cylinder and the brake cylinders.

2. A hydraulic brake system according to claim 1, wherein said switching valve further includes a valve seat member for slidably receiving said valve therein, and a housing for holding the valve seat and the switching control piston valve, said switch control piston valve being slidably situated inside the housing.

3. A hydraulic brake system according to claim 2, wherein said switch control piston valve is moved only when the fluid pressure falls under the predetermined pressure.

* * * * *